United States Patent
Lopez et al.

(10) Patent No.: US 8,644,709 B2
(45) Date of Patent: Feb. 4, 2014

(54) MULTIPORT PASSIVE DEVICE FOR SHARING OPTICAL SIGNALS

(75) Inventors: Juan Lopez, Grenade (FR); Sebastien Delorge, Toulouse (FR); Alexandre Touya, Toulouse (FR)

(73) Assignee: AIRBUS Operations S.A.S., Toulouse (FR)

( * ) Notice: Subject to any disclaimer, the term of this patent is extended or adjusted under 35 U.S.C. 154(b) by 137 days.

(21) Appl. No.: 13/497,182

(22) PCT Filed: Sep. 7, 2010

(86) PCT No.: PCT/FR2010/051856
§ 371 (c)(1),
(2), (4) Date: Mar. 20, 2012

(87) PCT Pub. No.: WO2011/036370
PCT Pub. Date: Mar. 31, 2011

(65) Prior Publication Data
US 2012/0183296 A1 Jul. 19, 2012

(30) Foreign Application Priority Data

Sep. 23, 2009 (FR) .................................... 09 56571

(51) Int. Cl.
*H04J 14/02* (2006.01)
*H04J 14/08* (2006.01)
(52) U.S. Cl.
CPC .................................... *H04J 14/02* (2013.01)
USPC .............................................. 398/82; 398/98

(58) Field of Classification Search
USPC ..................... 398/43, 74, 75, 82, 98
See application file for complete search history.

(56) References Cited

U.S. PATENT DOCUMENTS

| 5,400,418 | A  | * | 3/1995  | Pearson et al. ................. 385/11 |
| 5,404,241 | A  |   | 4/1995  | Ota |
| 6,760,509 | B2 | * | 7/2004  | Islam ............................. 385/24 |
| 6,915,079 | B1 |   | 7/2005  | Unitt et al. |
| 2002/0181048 | A1 | * | 12/2002 | Kuykendall et al. .......... 359/130 |

OTHER PUBLICATIONS

International Search Report Issued Jan. 18, 2011 in PCT/FR10/51856 Filed Sep. 7, 2010.

* cited by examiner

*Primary Examiner* — Dalzid Singh
(74) *Attorney, Agent, or Firm* — Oblon, Spivak, McClelland, Maier & Neustadt, L.L.P.

(57) ABSTRACT

A multiport passive optical signal sharing device enabling optical signals received by each of a first plurality of ports of the device to be transmitted to all of the ports of a second plurality of ports of the device. The device includes a first coupling mechanism adapted to combine signals received by each port of the first plurality of ports of said device into a first optical signal, the first optical signal being transmitted over a bi-directional optical link. The device further includes a second coupling mechanism and guide for redirecting the first optical signal in a form of a second optical signal into the bi-directional optical link, in the opposite direction from that of the first optical signal, the first coupling mechanism being adapted to duplicate the second optical signal on each port of the second plurality of ports of the device.

10 Claims, 6 Drawing Sheets

MULTIPORT PASSIVE DEVICE FOR SHARING OPTICAL SIGNALS

This invention relates to signal sharing devices in a communication network connecting several equipment items, in particular in an aircraft, enabling these equipment items to exchange data, and more particularly to a multiport passive optical signal sharing device.

The exchange of information items among equipment items of an aircraft is an increasingly important task in terms of security, whether for acquiring values originating from sensors, for transmitting instructions, in particular flight controls, or for sharing data among computers. In particular, it is necessary to ensure the integrity of certain exchanged data while guaranteeing a given transfer time. Specific communication networks have been developed for these purposes.

Networks of AFDX (abbreviation for Avionics Full Duplex Switched Ethernet in English terminology) type thus make it possible to connect sensors, actuators and computers. This type of network, based on the Ethernet protocol, uses virtual links defined as directed paths connecting a source to one or more addressees subscribing to these links. The data are transmitted through these links in the form of frames. An identifier placed in each frame is used to define the virtual link used.

In order to transmit frames in an AFDX-type network, it may be necessary to use concentrators (called hub in English terminology) and/or switches (called switch in English terminology). In general, a hub makes it possible to connect several devices on the same communication line by recopying each frame received by a given port onto each of the other ports. A switch differs from a hub in that it dynamically determines the ports onto which the frames are to be recopied. The latter generally are switched electrically on a physical layer made of copper.

The switches used in the communication networks of aircraft integrate electronic devices responsible for retransmitting frames to all the subscribers of the network. They therefore must be fed through an outside electrical power supply.

A problem peculiar to the electronic circuits of these equipment items, taking on a very special significance in the context of an aircraft, is linked to their complexity and to their design. In fact, they have many possible failure modes that have a direct impact on their reliability, also called MTBF (abbreviation for Mean Time Between Failures in English terminology). Moreover, these failure modes make it necessary to define means for detecting them and for protecting oneself against them.

Furthermore, these devices require a certain electrical power that entails costs in terms of weight, in particular of cabling and supply, which cannot be ignored in the context of an aircraft.

It is seen here that the realm of telecommunications and computer networks uses optical technologies making it possible in particular to be freed, to a certain extent, from power failure problems.

Thus, nowadays there are optical standards such as EPON (acronym for Ethernet Passive Optical Networks in English terminology) and GPON (acronym for Gigabit Passive Optical Networks in English terminology) in the technologies of communication networks. Nevertheless, they are defined for meeting needs peculiar to the information technologies sector and are not directly usable in aircraft. These standards employ passive optical components such as couplers and multiplexers which do not make it possible to switch frames from n subscribers to n subscribers. Moreover, such optical solutions do not guarantee deterministic communications in the sense of the AFDX-type networks.

The invention makes it possible to resolve at least one of the problems set forth above by proposing an optical passive device fulfilling a multiport repeater function.

The invention thus has as an object a multiport passive optical device for optical signal sharing making it possible to transmit signals received by each of a first plurality of ports of the said device to all of the ports of a second plurality of ports of the said device, this device comprising the following means, first coupling means adapted for combining signals received by each port of the said first plurality of ports of the said device into a first optical signal, the said first optical signal being transmitted over a bidirectional optical link;

second coupling means and guide means for redirecting the said first optical signal in the form of a second optical signal into the said bidirectional optical link, in the direction opposite to the said first optical signal, the said first coupling means being adapted for duplicating the said second optical signal on each port of the said second plurality of ports of the said device.

In this way, the device according to the invention makes it possible to reduce the zone of possible failures of the signal sharing device to basic failures such as loss of cables and to be freed from any supervisory mechanism. Moreover, this device does not require an electrical power supply, thus reducing the costs of implementation.

According to a specific embodiment, the device further comprises polarity control means in order to control the polarity of the said first redirected signal according to the polarity of the said first signal so as to prevent a degradation of the signals transmitted to each of the ports of the said second plurality of ports.

Still according to a specific embodiment, the said guide means comprise a plurality of optical links, called second optical links, the said bidirectional optical link being called first optical link, and according to which the said second coupling means further comprise means for duplicating the first optical signal on the said plurality of second optical links, and for combining the said first optical signals originating from each of the said second optical links in order to form the said second optical signal.

The use of several waveguides for retransmitting the same signal makes it possible to simplify the calculations of waveguide lengths in order to prevent the input and output signals of the composite port of the second optical coupler from being in phase opposition, for each wavelength of the transmitted signal. In this way, the use of several waveguides makes it possible to break the problem down into several parts processed separately in each waveguide used.

The length of the said guide means preferably is determined according to the wavelength of the signals transmitted by the said device so that the input and output signals of the composite port of the basic optical coupler are not in phase opposition, for each wavelength of the transmitted signal. In other words, the length of the waveguide preferably is determined according to the coherence length of the transmitted signal, for each wavelength considered.

Still according to a specific embodiment, the said first and second coupling means use a signal time-division multiplexing mode. Alternatively, the said first and second coupling means use a signal wavelength-division multiplexing mode.

Still according to a specific embodiment, the said first and/or second coupling means comprise at least one optical coupler or a plurality of optical couplers connected in cascade. These components are passive, simple to use and operational without any form of apprenticeship or configuration. Moreover, they make it possible to work on a wide spectral window.

Still according to a specific embodiment, the said first and/or second coupling means comprise at least one multiplexer.

The said shared signals in particular may represent AFDX-type data frames.

The invention also has as an object an aircraft comprising the device described above.

Other advantages, purposes and characteristics of this invention become apparent in the detailed description that follows, provided by way of non-limitative example, with reference to the attached drawings in which:

FIG. 2, comprising

FIG. 3, comprising FIGS. 3a to 3c, schematically illustrates three examples of structure of the optical signal sharing device illustrated on FIG. 1;

FIG. 4, comprising

FIG. 5, comprising

FIG. 6, comprising

FIG. 7, comprising

In general, the invention has as an object a passive optical device enabling n subscribers to exchange data. This device preferably is adapted for processing Ethernet frames meeting IEEE standard 802.3 using the concept of AFDX virtual links.

Figure 1:
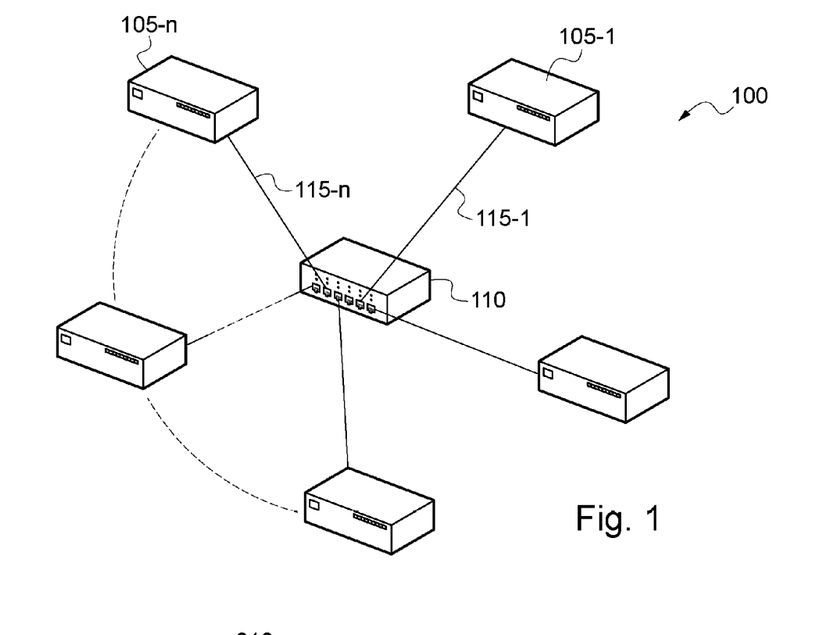
FIG. 1 schematically shows an AFDX-type network in which the invention advantageously is implemented.

FIG. 1 schematically illustrates an AFDX-type network 100 in which the invention advantageously is implemented. Subscribers 105-1 to 105-n, for example avionic computers, are connected to passive optical device 110 for signal sharing, in accordance with the invention, through optical links 115-1 to 115-n.

The n subscribers 105-1 to 105-n thus are connected to optical device 110, here of optical coupler type, via optical links 115-1 to 115-n responsible for carrying the exchanged AFDX Ethernet frames. Each subscriber is connected to a dedicated port of device 110. When a frame is received in the form of an optical signal, device 110 is responsible for transmitting this signal to all the other ports; that is to say to all the other subscribers connected thereto. In order to enable an auto-control, the frame also may be sent back to the transmitter. In this way, frame preferably is transmitted to all the ports. From a functional point of view, device 110 may be regarded as equivalent to a hub having a common optical medium for all the subscribers.

In this way device 110 makes it possible to transmit all the frames received, via each of the ports, to all the subscribers, without handling of frames and data. Since this device uses only passive components, for example optical couplers, it must be regarded as a passive transmitter. It is operational without any form of apprenticeship or configuration.

It is recalled here that an optical coupler is a bidirectional component that makes it possible to duplicate a signal or, conversely, to combine several signals into one. Nevertheless, when a signal is duplicated, the power of each of the signals resulting from the duplication is lower than that of the original signal. For example, when a signal is duplicated once, the two signals resulting therefrom have a power of approximately half that of the original signal for couplers ½ 3 dB (it is possible to adjust this ratio according to needs during the industrialization phase of these components). Yet, this component provides a considerable flexibility because it makes it possible to work on a wide spectral window.

It also is recalled here that an optical fiber makes it possible to establish a bidirectional communication between two devices under certain conditions. In particular, two signals having the same wavelength may be transmitted in opposite direction in the form of signals having orthogonal polarizations. It is necessary, in this case, to make certain that the phases of these signals are not in opposition.

Figure 2A:
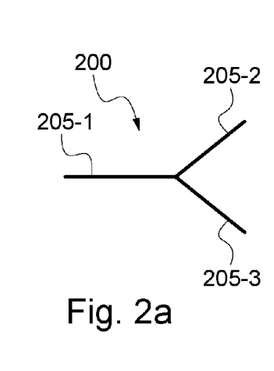
FIGS. 2a and 2b, illustrates an example of an optical coupler and optical couplers connected in cascade, respectively, able to be used in the signal sharing device illustrated on the preceding Figure.

FIG. 2a illustrates an exemplary basic optical coupler 200 able to be used in device 110. Basic optical coupler 200 here comprises three ports referenced 205-1 to 205-3. Port 205-1 is called composite port and ports 205-2 and 205-3 are called basic ports. If the basic optical coupler is used in the direction going from composite port 205-1 to basic ports 205-2 and 205-3, the signal received by composite port 205-1 is duplicated on basic ports 205-2 and 205-3. Conversely, if the basic optical coupler is used in the other direction (from basic ports 205-2 and 205-3 to composite port 205-1), the signal of composite port 205-1 corresponds to the combination of the signals received by basic ports 205-2 and 205-3. Naturally, the basic optical coupler may be used simultaneously in both directions. The output signal of composite port 205-1 then represents the combination of the input signals of basic ports 205-2 and 205-3 while the output signals of the latter correspond to the input signal of composite port 205-1.

Figure 2B:
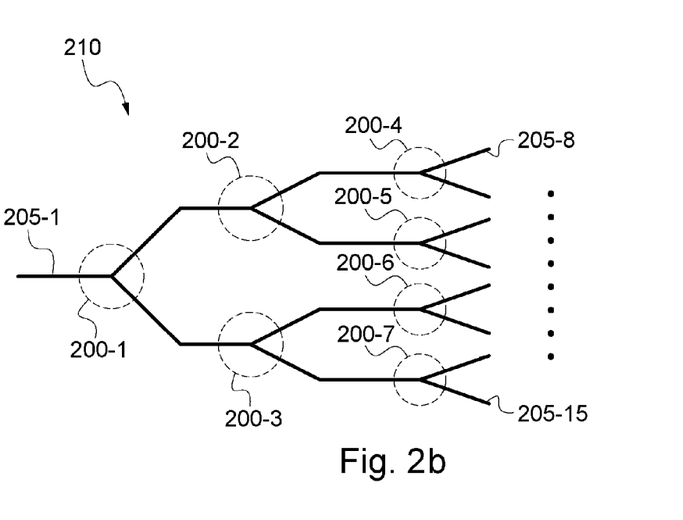

As illustrated on FIG. 2b, several basic optical couplers 200 may be connected in cascade. By way of illustration, optical coupler 210 here comprises seven basic optical couplers 200-1 to 200-7 such as the one shown on FIG. 2a. The output signal of composite port 205-1 here corresponds to the combination of the eight input signals of basic ports 205-8 to 205-15. Vice versa, the output signals of the eight basic ports 205-8 to 205-15 correspond to the input signal of composite port 205-1.

Although other types of optical couplers or other components, in particular multiplexers, may be used to form optical device 110 illustrated on FIG. 1, the remainder of the description is, with an illustrative intention, based on the use of such optical couplers and EPON or GPON standards. Nevertheless, whereas these standards have a "1 to n" type topology, the solution described is an "n to n" type solution, according to which each subscriber may be transmitter and receiver simultaneously.

Figure 3A:
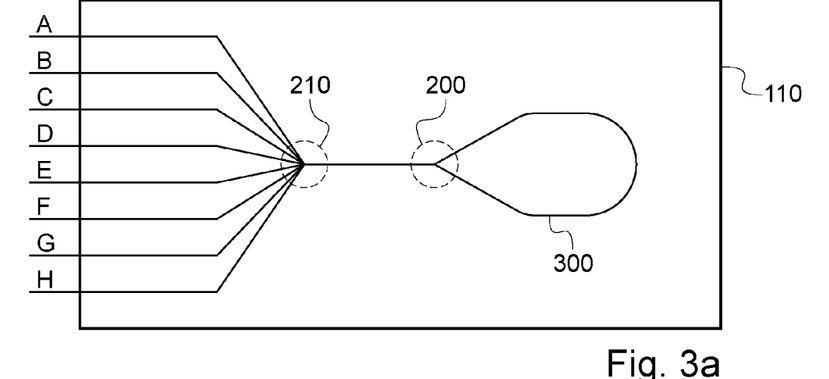
Figure 3B:
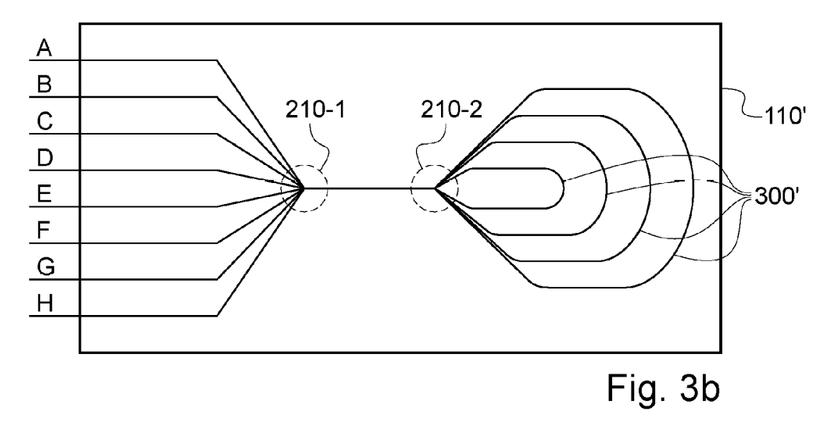
Figure 3C:
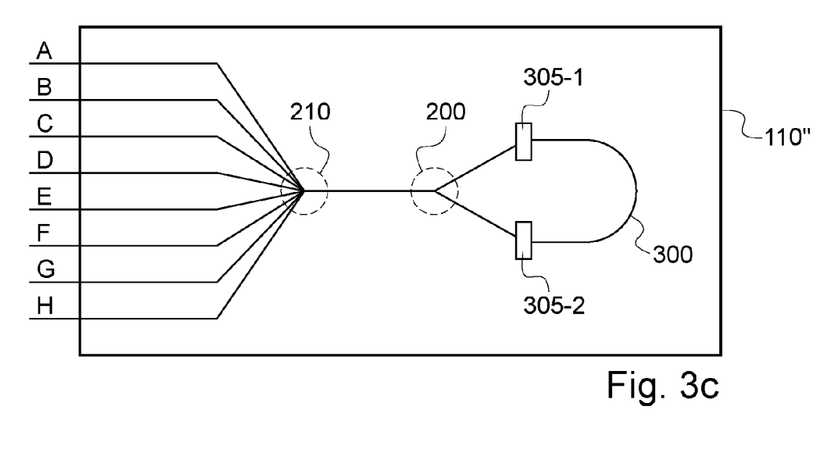

FIG. 3, comprising FIGS. 3a to 3c, schematically illustrates the structure of an optical signal sharing device here comprising 8 bidirectional ports referenced A to H.

By way of example, optical device 110 for signal sharing shown on FIG. 3a may be implemented from an optical coupler 210 and a basic optical coupler 200 such as illustrated on FIGS. 2a and 2b. It should be noted here that there are many technologies (fusion-drawing, planarian, ion diffusion, etc.) for implementing this type of function.

As illustrated, basic optical coupler 200 and optical coupler 210 are optically connected via their composite port (that is to say via the one that is connected to all the other ports). Optical device 110 further comprises a waveguide 300 connecting the two basic ports of basic optical coupler 200. The basic ports of optical coupler 210 form the ports of optical device 110.

Waveguide 300 makes it possible to connect the output of a basic port of basic optical coupler 200 to the input of the other basic port and conversely so that the signal received as input of the composite port of the basic optical coupler is found again as output of this same port.

The length of waveguide 300 is chosen so that the input and output signals of the composite port of the basic optical coupler are not in phase opposition, for each wavelength of the transmitted signal. In other words, the length of waveguide 300 is to be determined according to the coherence length of the transmitted signal, for each wavelength considered.

Optical device 110 thus is particularly suited to the transmission of mono-lambda signals, that is to say, using only one wavelength, for which the length of the waveguide may be easily determined.

Optical device 110' for signal sharing shown on FIG. 3b is implemented from two optical couplers 210-1 and 210-2 such as the one illustrated on FIG. 2b.

As illustrated, the two optical couplers 210-1 and 210-2 are optically connected via their composite port. Optical device 110 further comprises several waveguides 300' connecting two by two the basic ports of one of the optical couplers (here optical coupler 210-2). The basic ports of the other of the optical couplers form the ports of optical device 110.

As illustrated on FIG. 3b, the flow of the n subscribers is concentrated in a single signal in the first optical coupler, then distributed, with the aid of the second optical coupler, in several waveguides so that this signal is retransmitted to each subscriber. The number of waveguides is equal to half the number of basic ports of the second optical coupler. The latter may or may not have as many basic ports as the first optical coupler.

The advantage of using several waveguides for retransmitting the same signal lies essentially in the calculation of the length of the waveguides in order to prevent the input and output signals of the composite port of the second optical coupler from being in phase opposition, for each wavelength of the transmitted signal. In fact, if the wavelengths used are such that it is difficult to determine the length of a single waveguide compatible with the required optical quality of the signal sharing device and its physical space requirement, the use of several waveguides makes it possible to break the problem down into several parts processed separately in each waveguide used.

In this way optical device 110' is particularly suited to the transmission of multi-lambda signals, that is to say, using several wavelengths for which the length of a single waveguide would not make it possible to achieve the desired objective, in particular in terms of signal quality and/or size of the optical device.

Optical device 110' for signal sharing shown on FIG. 3c is implemented from an optical coupler 210' and a basic optical coupler 200' such as illustrated on FIGS. 2a and 2b.

As illustrated, basic optical coupler 200' and optical coupler 210' are optically connected via their composite port (that is to say via the one that is connected to all the other ports). Optical device 110" further comprises a waveguide 300 connecting the two basic ports of basic optical coupler 200'. The basic ports of optical coupler 210' form the ports of optical device 110".

Polarization control modules 305-1 and 305-2, preferably passive, here are added to each input of the basic ports of basic optical coupler 200' so that the polarization of the re-injected signal is orthogonal to the polarization of the input signal in order to prevent a degradation of the signals transmitted to each of the subscribers.

As with regard to optical device 110, waveguide 300 makes it possible to connect the output of a basic port of basic optical coupler 200' to the input of the other basic port and conversely so that the signal received as input of the composite port of the basic optical coupler is found again as output of this same port.

It should be commented here that polarization control modules may be implemented when several waveguides are used.

In this way, as illustrated on FIGS. 3a to 3c, by means of basic optical couplers and with the addition of waveguides, it is possible to form a component having a star topology that ensures communications from n to n subscribers and therefore, in particular, from a subassembly of n subscribers to another similar or different subassembly of n subscribers. The device formed functions passively for carrying signals having the same wavelength (mono-lambda mode) or several different wavelengths (multi-lambda mode). Moreover, data exchanges may be bidirectional without collision, by virtue of the intrinsic properties of the fiber.

Such a mechanism is illustrated in a general way on FIG. 4, comprising FIGS. 4a to 4d, when a signal is received from a subscriber. The optical signal sharing device here uses several waveguides.

Figure 4A:
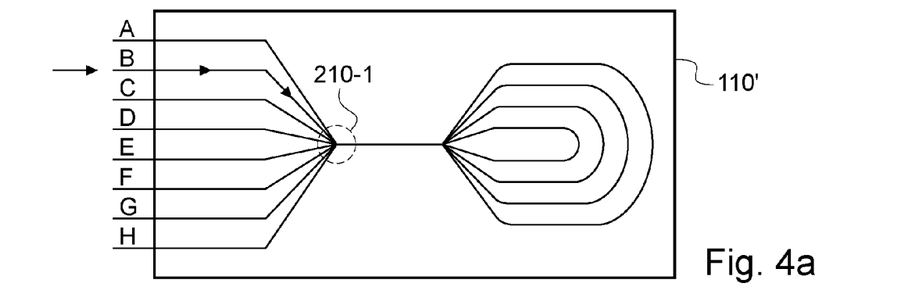
FIGS. 4a to 4d, illustrates the signal sharing mechanism implemented in the optical signal sharing device illustrated on FIG. 1.
Figure 4B:
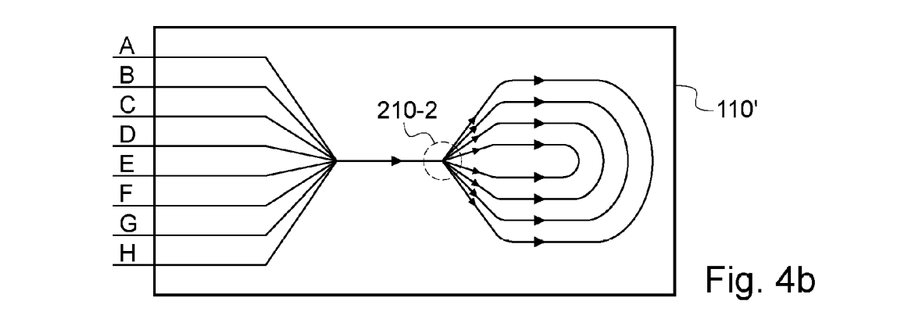

As illustrated on FIG. 4a, an optical signal received on port B of optical device 110' is transmitted to first optical coupler 210-1 to be combined with the other signals received by the other ports of device 110. Since no other port receives a signal, only this signal is transmitted to second optical coupler 210-2 where it is replicated on each of the basic ports of the second optical coupler (FIG. 4b).

Figure 4C:
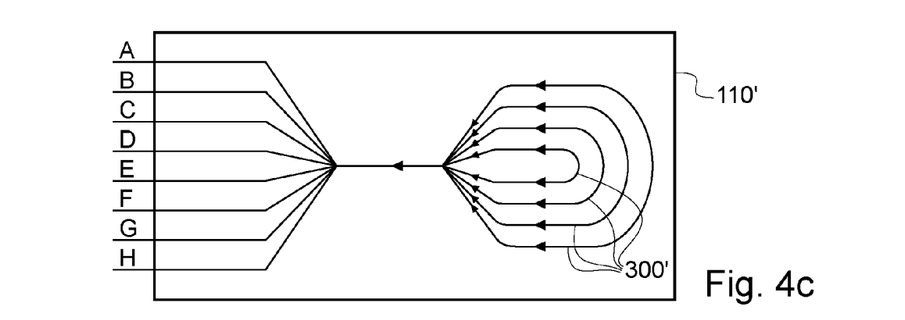

Since the signal then is redirected by each waveguide 300', it is received by each of the basic ports of the second optical coupler in which these signals are combined in order to be transmitted to the first optical coupler (FIG. 4c). It is seen here that since the signals transmitted by each waveguide are identical, the signal resulting from their combination is similar thereto.

Figure 4D:
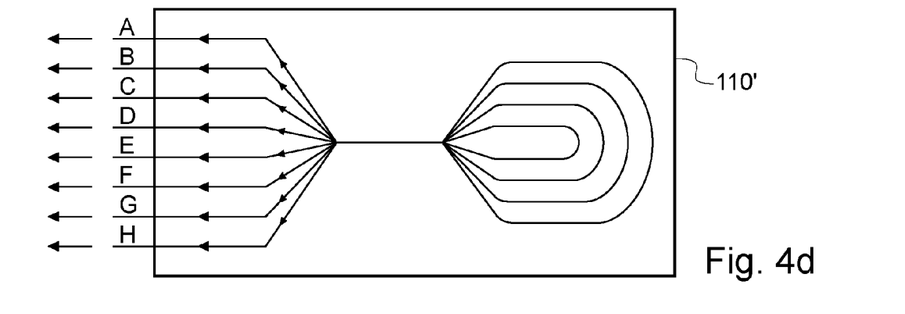

The signal received on the composite port of the first optical coupler then is duplicated on each of its basic ports, that is to say on each of the ports A to H of optical device 110' (FIG. 4d).

As indicated above, the use of optical couplers reduces the power of the transmitted signals. Thus, the optical power sent out by a subscriber on the medium typically is divided by n. By way of illustration, the most classic of the 1 to 2 optical couplers introduces an attenuation of 3 dB between the signal of the composite port and the signals passing in transit on the basic ports.

Furthermore, in order to limit the loss factor of the signal, it is necessary to control the bending radius of the waveguide or waveguides. It is seen here that the attenuation linked to the length of the waveguides is insignificant because of their small lengths.

In other words, the two deciding parameters in optical devices 110, 110' and 110" for calculating the power of the optical signals are the number of subscribers (as indicated above, 3 dB may be lost each time the signal is duplicated equitably on two ports) and the bending radius (the fibers are not designed to be bent and form a loop in the opposite direction). Consequently, according to the properties of the fibers used, it may be necessary to adapt the component to find a compromise among the topology, the number of subscribers and the characteristics of the component, in particular its dimensions.

According to a specific embodiment, a signal time-division multiplexing mode with access of TDMA (abbreviation for Time Division Multiple Access in English terminology) type may be implemented in order to guarantee all subscribers an access to the network, in turn, by using a sole A wavelength. In this way, the same sources may be used for all the subscribers, enabling a deterministic communication. A header advantageously is added to each frame to enable synchronization of the subscribers.

FIG. 5, comprising FIGS. 5a to 5d, illustrates such an embodiment implementing a signal time-division multiplexing mode (TDM), with a sole waveguide, in mono lambda (a single coherence length).

Figure 5A:
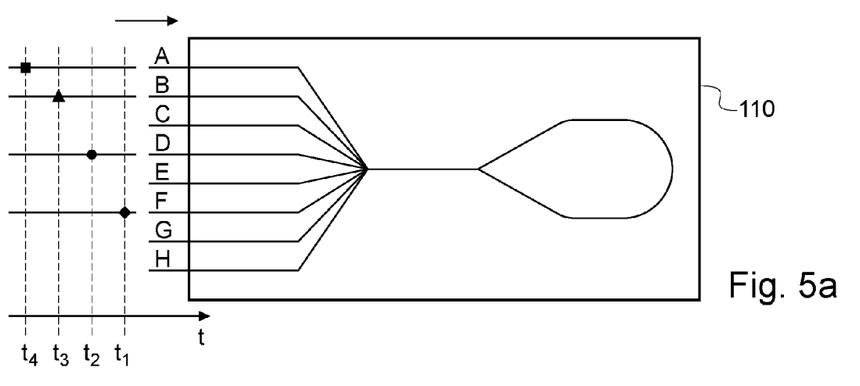
FIGS. 5a to 5d, illustrates a first specific embodiment implementing a signal time-division multiplexing mode (TDM), with a sole waveguide, in mono lambda (a single coherence length)

As illustrated on FIG. 5a, optical device 110, here similar to the device shown on FIG. 3a, receives, on ports A, B, D and F, four separate signals represented by a square, a triangle, a circle and a diamond, at instants $t_4$, $t_3$, $t_2$ and $t_1$, respectively.

Figure 5B:
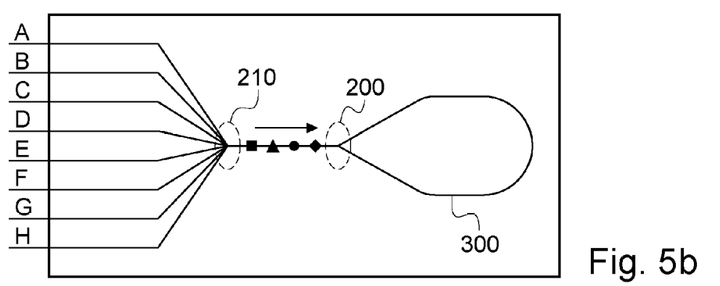
Figure 5C:
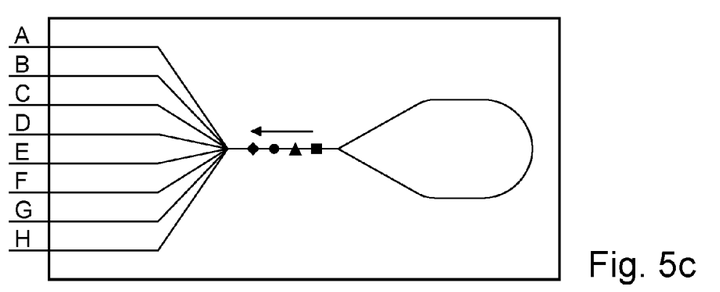

These signals are combined in optical coupler 210 to form the signal represented by the diamond followed by the circle, the triangle and the square. This signal then is transmitted to waveguide 300 by basic optical coupler 200 (FIG. 5b).

Figure 5D:
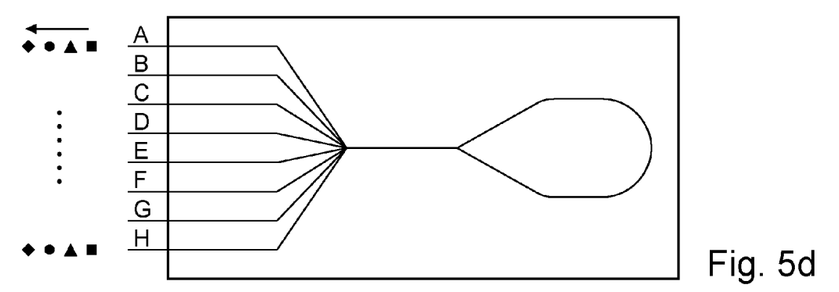

After having passed in transit through waveguide 300 and basic optical coupler 200, the signal is transmitted to optical coupler 210 (FIG. 5c) where the signal is replicated on each port of optical device 110 (FIG. 5d).

It is seen again here that the signals processed by optical device 110 have a sole wave length.

Advantageously, the implementation of optical device 110 according to this embodiment is carried out in two phases, an initialization phase and a use phase.

During the initialization phase, no subscriber is synchronized. Collisions between exchanged data are possible. When the subscribers detect a collision, they each wait a different, and preferably random, time before retransmitting a datum. This time is increased in the event of a new collision until at least half of the subscribers successfully accomplish their transmissions.

While having an identical objective intended to determine the interval during which each subscriber may transmit data, the initialization phase may be different. In particular, it may be controlled by a centralized system or comprise the defining of the subscribers according to predetermined parameters.

During the use phase, all the subscribers transmit by turns according to identical, static and predefined time intervals. Each message preferably contains a header to enable synchronization. The subscribers know in advance their position on a TDMA train, also called TDMA round, and thus know precisely at what moment to transmit.

As indicated above, it is considered here that the use phase begins when a predetermined number of subscribers, for example half, transmit properly in their time interval and without collision. After that, those that still are not synchronized receive time indications from the synchronized subscribers and may deduce therefrom an available time interval for transmitting data.

Figure 6A:
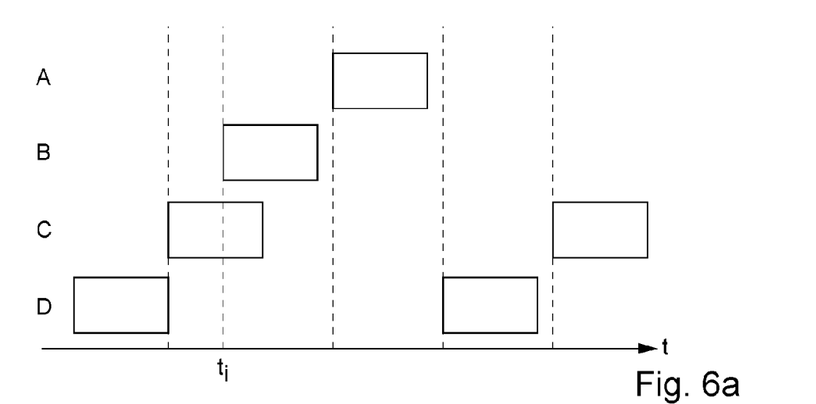
FIGS. 6a and 6b, illustrates the phases of initialization and use of data sharing according to the embodiment illustrated on FIG. 5.
Figure 6B:
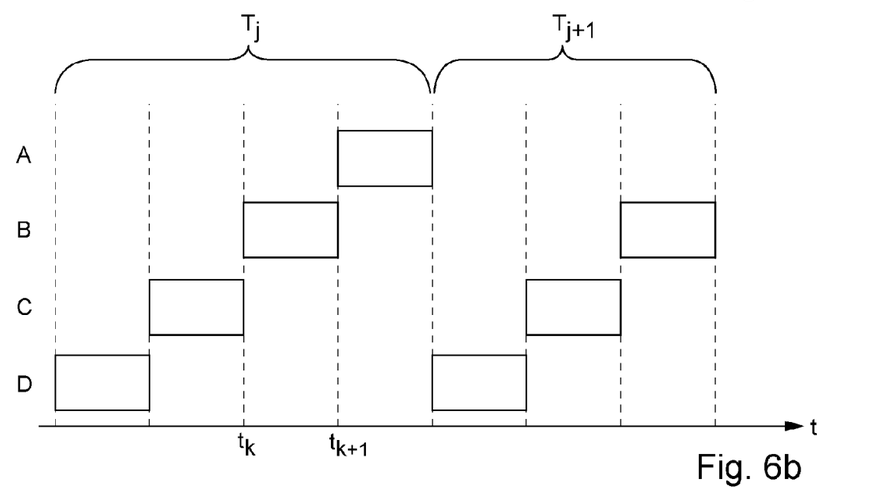

FIG. 6, comprising FIGS. 6a and 6b, illustrates an example of TDMA trains when subscribers connected to an optical device in accordance with the invention comprising four ports (A, B, C and D) are not synchronized and when they are synchronized, respectively.

As illustrated on FIG. 6a, a collision occurs at instant $t_1$ between the data transmitted by the subscribers connected to ports B and C. In this case, according to the exemplary initialization provided above, the initialization phase continues if fewer than half the subscribers properly transmit data in their time interval and without collision. Otherwise, the utilization phase is implemented and the non-synchronized subscribers use the information items received from the other subscribers in order to become synchronized.

FIG. 6b illustrates the data transmitted by the subscribers connected to ports A to D, during the use phase, when all the subscribers are synchronized. As illustrated, each subscriber may transmit data in a time interval that is allocated thereto in each TDMA train. By way of illustration, the subscriber connected to port B may transmit data between the instants $t_k$, and $t_{k+1}$ of the TDMA train $T_j$.

According to another specific embodiment, a wavelength-division multiplexing mode of WDMA (abbreviation for Wavelength Division Multiple Access in English terminology) type may be implemented in order to allow all the subscribers to access the network simultaneously by using different wavelengths. Each subscriber here has one or more wavelength filters for differentiating the received signals.

FIG. 7, comprising FIGS. 7a to 7d, illustrates such an embodiment implementing a signal wavelength-division multiplexing mode (WDM), with several waveguides (different coherence lengths).

Figure 7A:
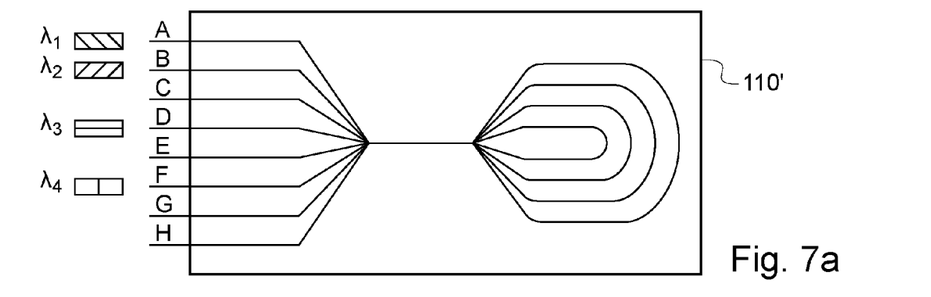
FIGS. 7a to 7d, illustrates a second specific embodiment implementing a multiplexing mode with signal wavelength-division multiplexing (WDM), with several waveguides (different coherence lengths)

As illustrated on FIG. 7a, optical device 10', here similar to the one shown on FIG. 3b, receives, on ports A, B, D and F, four signals having separate wavelengths, marked $\lambda_1$, $\lambda_2$, $\lambda_3$ and $\lambda_4$, respectively.

Figure 7B:
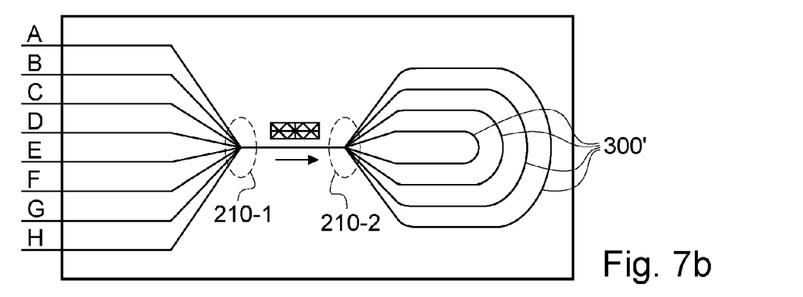
Figure 7C:
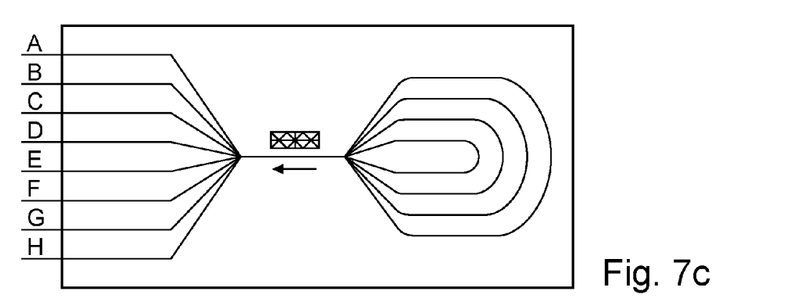

These signals are combined in optical coupler 210-1 in order to form a sole signal based on four wavelengths. This signal then is transmitted to each waveguide 300' by optical coupler 210-2 (FIG. 7b).

Figure 7D:
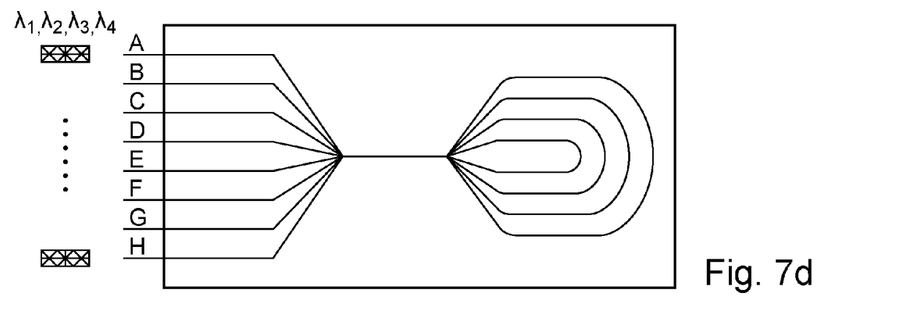

After having passed in transit through waveguides 300' and optical coupler 210-2, the signal is transmitted to optical coupler 210-1 (FIG. 7c) where the signal is replicated on each port of optical device 110' (FIG. 7d).

The optical signal obtained as output on each port of optical device 110' therefore is based on $\lambda_1$, $\lambda_2$, $\lambda_3$ and $\lambda_4$ wavelengths.

As indicated above, the subscribers each comprise at least one wavelength filter for extracting at least one signal having a predetermined wavelength from the received signal.

Figure 8:
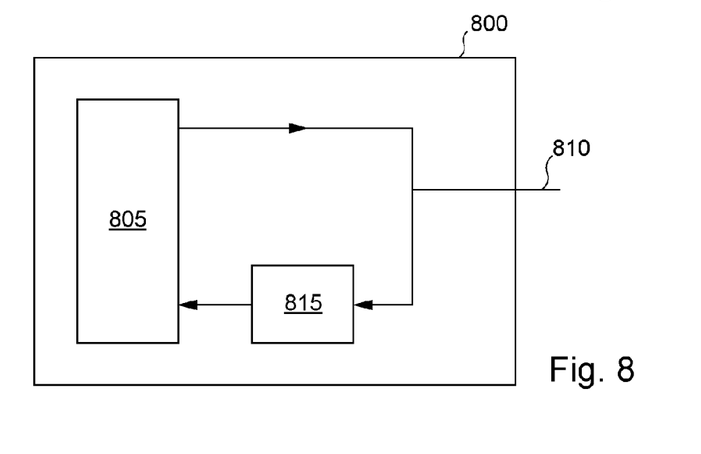
FIG. 8 schematically shows the architecture of a device of a subscriber adapted for transmitting and receiving data to and from an optical data sharing device in accordance with the embodiment described with reference to the preceding Figure.

FIG. 8 schematically shows the architecture of a device 800 of a subscriber, for example a computer, adapted for transmitting and receiving data to and from an optical device in accordance with the second embodiment described.

Device 800 here comprises a processing unit 805 adapted for processing optical signals. By way of illustration, processing unit 805 comprises an optical/electrical signal converter, a calculation unit (CPU, abbreviation for Central Processing Unit in English terminology), a read-only memory (ROM, acronym for Read Only Memory in English terminology) that can comprise programs, a random access or cache memory (RAM, acronym for Random Access Memory in English terminology) comprising registers adapted for recording variables and parameters created and modified in the course of running the aforesaid programs and a communication interface adapted for transmitting and receiving data to and from a communication network, wired or otherwise. Processing unit 805 also may have a hard disk able to comprise the aforesaid programs and data processed or to be processed and a memory card reader or any other external data storage system. A part of device 805 thus corresponds to a network interface between the optical device and the computer.

Processing unit 805 makes it possible to generate optical signals able to be transmitted to the optical device in accordance with the second embodiment described via optical link 810.

Device 800 further comprises at least one demultiplexer/filter 815, that makes it possible to extract one or more signals having specific wavelengths from a signal received by optical link 810. By way of illustration, demultiplexer/filter 815 may extract one of the signals having a $\lambda_1, \lambda_2, \lambda_3$ or $\lambda_4$ wavelength from the received signal transmitted by optical device 110 illustrated on FIG. 7*d*.

Naturally, to satisfy specific needs, an individual competent in the field of the invention will be able to apply modifications in the foregoing description.

The invention claimed is:

1. A multiport passive optical device for optical signal sharing making it possible to transmit signals received by each of a first plurality of ports of the device to all of ports of a second plurality of ports of the device, the device comprising:
   first coupling means adapted for combining signals received by each port of the first plurality of ports of the device into a first optical signal, the first optical signal being transmitted over a bidirectional optical link; and
   second coupling means and guide means for redirecting the first optical signal in a form of a second optical signal into the bidirectional optical link in a direction opposite to the first optical signal,
   the first coupling means adapted for duplicating the second optical signal on each port of the second plurality of ports of the device.

2. A device according to claim 1, further comprising polarity control means for controlling polarity of the first redirected signal according to polarity of the first signal.

3. A device according to claim 1, wherein the guide means comprises a plurality of second optical links, the bidirectional optical link is first optical link, and wherein the second coupling means further comprises means for duplicating the first optical signal on the plurality of second optical links, and for combining the first optical signals originating from each of the second optical links to form the second optical signal.

4. A device according to claim 1, wherein the length of the guide means is determined according to the wavelength of the signals transmitted by the device.

5. A device according to claim 1, wherein the first and second coupling means implement a signal time-division multiplexing mode.

6. A device according to claim 1, wherein the first and second coupling means implement a signal wavelength-division multiplexing mode.

7. A device according to claim 1, wherein the first and/or second coupling means comprises at least one optical coupler or a plurality of optical couplers connected in cascade.

8. A device according to claim 1, wherein the first and/or second coupling means comprises at least one multiplexer.

9. A device according to claim 1, wherein the shared signals represent AFDX-type data frames.

10. An aircraft comprising the device according to claim 1.

\* \* \* \* \*